Patented Jan. 5, 1926.

UNITED STATES PATENT OFFICE.

OTTO STINER AND ALFRED HAUSWIRTH, OF BERN, AND ALFONS GAMS, OF BASEL, SWITZERLAND, ASSIGNORS TO SOCIETY OF CHEMICAL INDUSTRY IN BASLE, OF BASEL, SWITZERLAND.

VITAMINE PREPARATION AND A PROCESS OF MAKING SAME.

No Drawing.   Application filed January 18, 1919.   Serial No. 271,921.

*To all whom it may concern:*

Be it known that we, OTTO STINER, a citizen of the Swiss Republic, and resident of Bern, Switzerland, ALFRED HAUSWIRTH, a citizen of the Swiss Republic, and resident of Bern, Switzerland, and ALFONS GAMS, a citizen of the Swiss Republic, and resident of Basel, Switzerland, have invented new and useful Vitamine Preparations and Processes of Making Same, of which the following is a full, clear, and exact specification.

Our invention relates to the manufacture of a vitamine malt preparation which contains in durable form not only the vitamines stable to heat and storage, but also those labile to these influences.

It is known that the preservation of vitamines and materials containing vitamines depends on numerous factors. In many cases, as for instance in the case of the antiscorbutic vitamine, heating for a short or long period to a more or less high temperature, (for instance 60–70° C.) or even drying or standing at room temperature, suffices to destroy the activity to a great part or completely (cf. Holst & Frölich, Zeitschrift für Hygiene Vol. 72. 1. 1912 and Vol. 75. 334. 1913).

The methods hitherto known for the preparation of malt extracts did not take into account these facts, temperatures rising up to 70–100° being usual in the course of their preparation, be it in the preliminary treatment of the amylaceous materials and of the malt used, be it in the diastatic process itself or in the final concentration of the extracts. By these processes any vitamines of thermolabile character which may have been present in the starting materials are of course more or less completely destroyed.

We have found, that it is possible to obtain vitamine malt preparations containing not only the vitamines stable to heat and storing, but also those labile to these influences, if the mashing and saccharifying process of the amylaceous material are conducted in presence of a small quantity of non-toxic, polybasic organic acid and at a temperature below 60° C. and if the concentration of the thus obtained malted product is also effected in the presence of a small quantity of the said acid and at a temperature below 60° C.

As an acid substance we use particularly citric or tartaric acid, but it is evident, that any other non-toxic polybasic organic acid may be employed. To attain the scope of our invention we employ preferably a quantity of acid sufficient to make the reaction feebly acid to congo. However, even smaller quantities may be serviceable for the purpose. If desired, the acid may be partly neutralized at any suitable stage of the concentrating operation, as in every case the achieved new vitamine malt preparation must contain at least traces of the free polybasic organic acid employed.

As an amylaceous material especially adapted for the purpose of our invention we use chestnut-meal. This material which has not been employed before for preparing malt extracts, possesses the advantage of not only being rich in vitamines but also imparting to the malted product a very good flavour. Instead of chestnut-meal alone other vitaminous starchy materials or mixtures of the latter with chestnut-meal may be used.

The saccharification is effected with fresh green malt, rich in the antiscorbutic vitamine, instead of with kiln-dried malt, the vitamine content of which is destroyed or reduced to a minimum by the process of its preparation.

The malted extract resulting from the saccharification process may be concentrated to the usual sirupy consistency or to complete dryness.

We are aware of the fact that the evaporation or thickening of malt extracts at temperatures below 60° C. has already been effected, but heretofore this evaporation or thickening has never been effected in the presence of a small quantity of free polybasic organic acid and with malt extracts obtained by mashing and saccharifying the amylaceous material in the presence of small quantity of such an acid.

The malt extract obtained by our process, is especially adapted, by its high content of vitamines of different kinds, for the treatment of various avitaminous diseases. By its nutritional value and its content of diastase, further by its good taste and excellent wholesomeness, it is also of great value of a reconstituent and tonic for reconvalescents a. s. o The following example illustrates the invention:

Chestnut-meal is treated at 55° C. with ground fresh green malt and water in presence of about 0.1 per cent of citric acid and a preservative, such as toluene, with continuous uniform stirring for several days. The whole is then filtered and concentrated in a vacuum and a low temperature to the desired degree of consistency.

What we claim is:

1. The herein described manufacture of a vitamine malt preparation in durable form, containing not only the vitamines stable to heat and storing, but also those labile to these influences, by simultaneously mashing and saccharifying amylaceous materials rich in vitamines with ground fresh green malt and water in the presence of a non-toxic polybasic organic acid in a quantity not higher than that sufficient to make the reaction feebly acid to congo and at temperatures below 60° C., filtering and evaporating the filtrate in a known manner to the desired degree of consistency.

2. The herein described manufacture of a vitamine malt preparation in durable form, containing not only the vitamines stable to heat and storing, but also those labile to these influences, by simultaneously mashing and saccharifying chestnut-meal with ground fresh green malt and water in the presence of a non-toxic polybasic organic acid in a quantity not higher than that sufficient to make the reaction feebly acid to congo and at temperatures below 60° C., filtering and evaporating the filtrate in a known manner to the desired degree of consistency.

3. The herein described manufacture of a vitamine malt preparation in durable form, containing not only the vitamines stable to heat and storing, but also those labile to these influences, by simultaneously mashing and saccharifying amylaceous materials rich in vitamines with ground fresh green malt and water in the presence of citric acid in a quantity not higher than that sufficient to make the reaction feebly acid to congo and at temperatures below 60° C., filtering and evaporating the filtrate in a known manner to the desired degree of consistency.

4. The herein described manufacture of a vitamine malt preparation in durable form, containing not only the vitamines stable to heat and storing, but also those labile to these influences, by simultaneously mashing and saccharifying chestnut-meal with ground fresh green malt and water in the presence of citric acid in a quantity not higher than that sufficient to make the reaction feebly acid to congo and at temperatures below 60° C., filtering and evaporating the filtrate in a known manner to the desired degree of consistency.

5. As a new article of manufacture the herein described vitamine malt preparation in durable form, containing not only vitamines stable to heat and storing, but also vitamines labile to these influences, the said vitamine malt preparation containing at least traces of a non-toxic polybasic organic acid.

6. As a new article of manufacture the herein described vitamine malt preparation in durable form, containing not only vitamines stable to heat and storing, but also vitamine labile to these influences, the said vitamine malt preparation containing at least traces of citric acid.

In witness whereof we have hereunto signed our names this 12th day of December 1918.

Dr. OTTO STINER.
Dr. Med. ALFRED HAUSWIRTH.
Dr. ALFONS GAMS.